US011662644B2

(12) United States Patent
Babushkin et al.

(10) Patent No.: US 11,662,644 B2
(45) Date of Patent: May 30, 2023

(54) HIGH EFFICIENCY LASER SYSTEM FOR THIRD HARMONIC GENERATION

(71) Applicant: IPG PHOTONICS CORPORATION, Oxford, MA (US)

(72) Inventors: Andrei Babushkin, Oxford, MA (US); Andrey Bordenyuk, Oxford, MA (US)

(73) Assignee: IPG PHOTONICS CORPORATION, Oxford, MA (US)

(*) Notice: Subject to any disclaimer, the term of this patent is extended or adjusted under 35 U.S.C. 154(b) by 1277 days.

(21) Appl. No.: 16/088,503

(22) PCT Filed: Mar. 29, 2017

(86) PCT No.: PCT/US2017/024678
§ 371 (c)(1),
(2) Date: Sep. 26, 2018

(87) PCT Pub. No.: WO2017/172868
PCT Pub. Date: Oct. 5, 2017

(65) Prior Publication Data
US 2020/0301243 A1    Sep. 24, 2020

Related U.S. Application Data

(60) Provisional application No. 62/315,290, filed on Mar. 30, 2016.

(51) Int. Cl.
*G02F 1/35* (2006.01)
*G02F 1/355* (2006.01)
(Continued)

(52) U.S. Cl.
CPC ............ *G02F 1/353* (2013.01); *G02F 1/3501* (2013.01); *G02F 1/3551* (2013.01); *G02F 1/37* (2013.01);
(Continued)

(58) Field of Classification Search
CPC .... G02F 1/3501; G02F 1/3503; G02F 1/3507; G02F 1/3509; G02F 1/353; G02F 1/354; G02F 1/3551; G02F 1/37; H01S 3/0092
See application file for complete search history.

(56) References Cited

U.S. PATENT DOCUMENTS 5,047,668 A    9/1991  Bosenberg
5,136,597 A    8/1992  Nightingale
(Continued)

FOREIGN PATENT DOCUMENTS

WO    WO-2014095264 A1 *  6/2014  ........... G02F 1/3501

*Primary Examiner* — Daniel Petkovsek
(74) *Attorney, Agent, or Firm* — Yuri Kateshov, Esq.

(57) ABSTRACT

A frequency conversion laser system is configured with a single mode (SM) laser source outputting a pulsed pump beam at a fundamental frequency and a nonlinear optical system operating to convert the fundamental frequency sequentially to a second harmonic (SH) and then third harmonic (TH). The nonlinear optical system includes an elongated SHG crystal traversed by the SM pulsed pump beam which generates the SH beam. The SHG crystal has an output surface inclined relative to a longitudinal axis of the SHG crystal at a first wedge angle different from a right angle. The nonlinear optical system further has an elongated THG crystal with an input surface which is impinged upon by a remainder of the pump and SHG beams which propagate through the THG crystal at a walk-off angle therebetween to generate a third harmonic (TH) beam, the input surface of the THG crystal being inclined to a longitudinal axis of the THG crystal at a second wedge angle. The output and input surfaces of respective SHG and THG crystals are inclined so as to minimize the walk-off angle between SH and IR pointing vectors in the THG crystal thereby improving the conversion efficiency and TH output beam's ellipticity.

11 Claims, 6 Drawing Sheets

(51) Int. Cl.
  *G02F 1/37* (2006.01)
  *H01S 3/00* (2006.01)
  *H01S 3/067* (2006.01)
  *H01S 3/0941* (2006.01)
  *H01S 3/23* (2006.01)

(52) U.S. Cl.
  CPC .......... *H01S 3/0092* (2013.01); *G02F 1/3503* (2021.01); *G02F 1/354* (2021.01); *G02F 1/3507* (2021.01); *G02F 1/3509* (2021.01); *H01S 3/06754* (2013.01); *H01S 3/0941* (2013.01); *H01S 3/2308* (2013.01)

(56) References Cited

U.S. PATENT DOCUMENTS

| | | |
|---|---|---|
| 5,144,630 A | 9/1992 | Lin |
| 5,384,803 A | 1/1995 | Lai |
| 7,292,387 B2 | 11/2007 | Hoffman et al. |
| 7,742,221 B2 * | 6/2010 | Mizuuchi ................ G02F 1/37 359/328 |
| 9,507,239 B2 * | 11/2016 | Lehmann .............. H01S 3/0092 |
| 2006/0222372 A1 * | 10/2006 | Spinelli ................ H01S 3/2383 398/183 |
| 2008/0316590 A1 * | 12/2008 | Mizuuchi .............. G02F 1/3775 359/328 |
| 2011/0222565 A1 | 9/2011 | Horain et al. |
| 2011/0243163 A1 * | 10/2011 | Peng .................... G02F 1/3534 359/328 |
| 2013/0028277 A1 | 1/2013 | Dong et al. |
| 2016/0072247 A1 | 3/2016 | Lehmann et al. |

\* cited by examiner (Known Art)

(Known Art)

(Known Art)

HIGH EFFICIENCY LASER SYSTEM FOR THIRD HARMONIC GENERATION

BACKGROUND OF THE DISCLOSURE

Field of the Disclosure

The disclosure relates to a system for obtaining enhanced frequency conversion efficiencies in non-linear crystals designed for sum frequency mixing (SFM) nonlinear processes.

Prior Art Discussion

Currently, there is a growing demand for high power ultraviolet (UV) lasers in various industrial applications such as LED scribing, chip dicing, via-hole drilling, plastics marking and others. In comparison with more common IR lasers, UV lasers have an advantage of higher linear and nonlinear absorption of the UV light by some materials and their possibility to achieve smaller focus spots.

Typically, generation of UV light requires the use of two nonlinear optical crystals, such as Lithium triborate or Lithium borate (LBO). Initially, the fundamental frequency of the pump beam—an infrared (IR) laser beam—generates its second harmonic (SH) while propagating through the first nonlinear crystal. The second harmonic generation (SHG) non-linear process includes combining two photons of IR input radiation to produce a photon of visible output radiation having twice the frequency of the input infrared radiation. In third harmonic generation (THG), taking place in the second nonlinear crystal, a non-linear process includes combining a photon of the SH output with a photon of the IR input to output the UV radiation at a frequency three times the frequency of the pump beam.

Nonlinear crystals including LBO are often characterized by an anisotropic refractive index meaning that the index of refraction depends on the direction of polarization of radiation in the birefringent crystal. In the latter, the intensity distribution drifts away from the direction defined by the wave vector k which is always normal to the wavefront WF, as illustrated in FIG. 1. This phenomenon, called spatial walk-off, birefringent walk-off or Poynting vector walk-off S, defines the direction of energy transport and is associated with some finite walk-off angle ρ between the Poynting vector S and wave vector k. Spatial walk-off occurs only for a beam with extraordinary polarization propagating at some angle θ relative to the optical axes, so that the refractive index $n_e$ and the phase velocity become dependent on that angle. A beam with ordinary polarization (where the refractive index $n_o$ is not dependent on the propagation angle) does not experience walk-off.

FIG. 2 illustrates a typical scheme employed for generating UV light. A type I non-critically matched LBO 12 is used in the illustrated scheme as a nonlinear medium for SHG. The LBO 12 outputs orthogonally polarized pump and SH beams 16 and 18. The second LBO 14 is a type II critically phase matched (CPM) LBO cut for SFM at the interacting frequencies to generate a third harmonic (TH) output beam 22. For type II phase matching the polarization of input pump (IR) and SH beams 16, 18 at respective fundamental frequency and its second harmonic should be perpendicular to one another, i.e., o+e→o or o+e→e, which is exactly what LBO 12 provides. Accordingly, the illustrated scheme is convenient because there is no beam manipulation needed between the nonlinear crystals except for focusing of the beams.

In the THG scheme of FIG. 2, beams 16, 18 are collinear and coaxial and propagate along a light path in a direction normal to an input face 20 of LBO crystal 14. During a sum frequency nonlinear process in type II phase matching LBO crystal 14, wave vectors k1 and k2 of respective pump and signal waves and Poynting vector S1 of the pump wave are all parallel/collinear to one another. However, the Poynting vector S2 of the SH deviates from wave vector k2 and thus from pointing vector S1 at a walk-off angle ρ. It means that the energy transfer between beams 16, 18 within crystal 14 occurs only along a relatively short length known as interaction length L. As a consequence, as these beams propagate through crystal 14, the separation therebetween reduces the THG conversion efficiency which, in case of pulsed lasers, is a peak power in generated TH. Based on the foregoing, the conversion efficiency is limited by a relatively small interaction length L.

The walk off phenomenon is particularly detrimental to the conversion efficiency when using tightly focused (small diameter) high intensity beams. Yet the latter is necessary since the efficiency of the frequency conversion process is a function of light intensity, particularly in a relatively low peak power system outputting no more than hundreds of kilowatts. In response, a number of approaches have been devised to compensate for the walk-off effect in a high harmonic conversion process employed in a single mode (SM) laser system.

One of numerous approaches addresses the problem of walk-off by the having length of the crystal relatively short so as to minimize the separation between the vectors upon exiting the crystal. However reducing the crystal length leads to the decreased conversion efficiency which is essential to any THG process.

Another method of minimizing the walk-off effect includes expanding the diameter of the beams so that displacement effects are minimized. Yet the conversion efficiency lowers with a greater spot size (decreased intensity) of focused beam in the crystal since the light power density decreases. This approach however may work nicely for high power laser sources with a peak output power reaching hundreds of MW since an insignificant drop of light power density would be difficult to notice. In contrast, even a relatively insignificant power density drop would dramatically decrease the conversion efficiency when low power laser sources with output peak powers of up to hundreds of kWs are employed.

An alternative approach includes the use of two nonlinear crystals in the THG process wherein the walk-off generated by a suitably orientated second crystal is offset by the walk-off in the first crystal. While this approach is somewhat successful in reducing walk-off effects, certain aspects of this concept are problematic. For example, complete compensation for walk-off effects is often difficult to achieve. Further, the cost and complexity of thus designed laser are increased.

Yet a further approach is based on the refraction effect which occurs when a beam enters an input face of non-linear crystal at the normal angle of incidence. In this case, the wave vector k of the incident light beam is refracted while it propagates through the crystal's input face according to Snell's law. The latter establishes the relationship between the angles of incidence and refraction with the index of refraction of the materials on either side of the input face. In the context of the THG process, two wave vectors ($k_1$ and $k_2$) associated with respective ordinary (o) and extraordinary (e) polarization states are refracted at different angles. In summary, the extent of this effect, referred to as wave vector double refraction and used in the presently disclosed inventive system, depends on the orientation of the input face of the second crystal relative to the crystal's optical axes and the angles of incidence of respective pump and SH incident beams that can be selected to provide the walk-off compensation.

The wave vector double refraction effect is disclosed in U.S. Pat. No. 5,136,597 ('US 597) in the context of SHG process and more specifically SHG in a resonant cavity method. Reiterating what was known good half a century ago, this reference discloses setting the angle of incidence of the pump beam such that the walk-off angle is compensated in a KTP crystal to provide optimal conversion efficiency. This reference does not anticipate the more complex requirements which characterize the general case of SFM, where numerous additional considerations must be taken into account. For example, the compactness of the entire THG system, its multi-level structure and other considerations all applicable to THG systems are not even mentioned.

Among other considerations, the beam shape and astigmatism characteristics are as important for a higher harmonic generation scheme as the conversion efficiency. This is because the majority of laser industrial applications benefit from a circular beam. The intensity of the beam in these applications along X-Y axes should be as close to each other as possible. Naturally, the circular cross-section is ideal for this purpose.

The U.S. Pat. No. 7,292,387 (US '387) addresses the ellipticity problem in the THG process and teaches a scheme based on the wave vector double refraction. This reference discloses compensating the walk-off angle by adjusting the angle of incidence of pump and SH beams relative to the optical axis of the second crystal. The disclosed THG scheme includes two LBO crystals—one 95 a non-critically phase-matched LBO for SHG process and type II critically phase-matched LBO 100 for outputting TH.

The scheme disclosed in US '387 and shown in FIG. 3 includes numerous optical elements increasing the overall structural complexity. The shown optical elements are so located that crystals 95 and 100 have respective planes which are not parallel to one another and, in fact, define an obtuse angle therebetween. The biggest disadvantage of this scheme is the necessity of the elaborate and therefore difficult alignment. Such a structure requires a specifically contoured support surface and additional space which contribute to complexity and cost of the structure.

Revisiting the problem of beam distortion in the THG scheme, it may be further compounded if the elliptical SH and remainder of the pump beams are coupled into THG crystal 100. Typically, a lens 92 is used to couple the beams into THG crystal 100. Three beams propagate in the THG crystal: pump, SH and TH output beams. For a phase-matching condition to be met in the THG crystal—in other words, for the frequency conversion process to be efficient—one or two of the three beams in the THG crystal must be an extraordinary beam. As shown, the second THG crystal is in o-e-o configuration: pump and TH beams have ordinary polarization, while the SH beam has extraordinary polarization. As a consequence, the SH beam propagates at a second walk-off angle $\rho'$ with respect to pump and TH beams, and this walk-off, together with the ellipticity of the SH beam, in general causes output TH beam to be noncircular.

A need, therefore, exists for a THG laser system operating at a high frequency conversion efficiency.

Another need exists for a THG laser system configured to minimize inherent astigmatism and ellipticity of the output UV beam.

Still another need exists for a simple low cost, simply configured and robust THG laser system.

Yet another need exists for a cost effective THG laser system configured with fewer than in known systems components which all are substantially coplanar.

BRIEF SUMMARY OF THE DISCLOSURE

A nonlinear optical system configured in accordance with the disclosure satisfies the above identified needs. The inventive laser system can be successfully used for a relatively low average and peak power of an ytterbium (Yb) pump source outputting pulses of infrared (IR) light at a frequency of about 300 kHz in a 1μ wavelength range. Within the context of this disclosure, the low power pump Yb source is the source outputting of to 30 W of an average power in a 1-2 ns pulse with pulse energy in a 50-60 microjoule (μJ) range. The generation of the TH is characterized by conversion efficiency which varies in a 50-55% range with average and peak powers of UV light being roughly equal to half of the IR powers. The high average power of the Yb pump source is considered to be in a 50-60 W range, whereas the pulse energy can reach up to 180 μJ. The conversion efficiency during the generation of the TH in this class of lasers lies within a 65-70% range. To the best of Applicants' knowledge, either of the above-disclosed efficiency ranges has never been attained for the disclosed laser source outputting a Gaussian or substantially Gaussian beam.

In accordance with the first aspect, the disclosed system is configured with at least one first, upstream nonlinear crystal which provides a SH beam in response to the irradiation by a pump beam at the fundamental frequency. The SH beam and remainder of the pump beam are incident on a second, downstream nonlinear crystal generating a third beam at third harmonic (TH). The first and second nonlinear crystals have respective output and input surfaces extending at oblique angles relative to respective longitudinal crystal axes.

The output and input surfaces are manufactured with such wedge angles that the SH beam incident on the input surface of the second crystal refracts so that it tilts (changing direction) within this crystal at a controllable angle based on the wave vector double refraction phenomenon compared to the SH beam incident on a perfectly rectangular second crystal. Depending on the desired trade-off between the conversion efficiency and ellipticity of UV light, the SH beam can fully overlap the rays at respective fundamental and TH frequencies over the entire length of the crystal. Thus, the inclined output and input surfaces of respective first and second crystals provide the desired compensation for a walk-off angle between pointing vectors of respective pump and SH beams in the second crystal so as to maximize the conversion efficiency and minimize the ellipticity of the UV beam.

In accordance with the second aspect of the disclosure, the first and second crystals disclosed in the first aspect are both LBO crystals. The first crystal is a type I non-critically phase-matched LBO for SHG process, whereas the second crystal is configured as a type II critically phase-matched LBO for generating UV light at the TH.

However, LBO crystals are not the only type of nonlinear crystals that can meet the goal of the present disclosure. With minimal modifications well understood by an artisan in laser physics, such crystal as Barium borate (BBO), potassium dihydrogen phosphate (KDP, KD*P—potassium dideuterium phosphate) and others capable of generating higher harmonics can be easily incorporated within the scope of the disclosure and used in conjunction with all or any of the above and subsequent aspects.

In the third aspect, the disclosed system considered in light of the first or second or both first and second aspects, the output and input surfaces of respective first and second crystals of first or second or both first and second aspects are either parallel or slightly slanted relative to one another. The angle between the surfaces preferably does not exceed 0-20°. Note that the angle can be used with each of the subsequently discussed aspects.

In the fourth aspect, the disclosed system of any of the above discussed three aspects or any possible combination of these aspects is configured with the first and second crystals lying in respective planes each of which includes the crystal's longitudinal axis. The planes may be mutually offset in a direction perpendicular to the light path at a distance varying between 0 and 1 mm. Accordingly, for all practical purposes, the first and second crystals are substantially coplanar. The co-planarity of the crystals simplifies the system's structure which is thus cost efficient and compact. It should be pointed out that the crystal discussed in this aspect of course can be used in the disclosed structure of any subsequently disclosed aspect.

In accordance with the fifth aspect, the disclosed system of any the above four aspects and any combination of these aspects, the first and second crystals are spaced at a distance along the light path varying between zero and 20 mm. Even the 20 mm distance is incomparably smaller than that of the prior art devices known to the Applicants. The zero mm distance, i.e., when there is no free space between the crystals, is possible in a configuration of the crystals having output and input surfaces parallel to one another. The range 0-20 mm considerably improves the astigmatism of the disclosed system which may be as low as 0.95 D. The distance discussed here should be always considered in light of any subsequent aspect of the disclosure.

According to the sixth aspect, the disclosed system of any of the previous five aspects or any combination of these is configured with the first and second crystals which, if spaced apart, have a space therebetween free from obstacles. The absence of a customary focusing lens located between the crystals in the known prior art minimizes optical aberrations, reduces the cost and improves ruggedness of the disclosed system. Clearly, this feature is combinable not only with the above-discussed aspects, but is also beneficial to all subsequent aspects.

In accordance with the seventh aspect, the system disclosed in any of the above first six aspects or any combination of these aspects is further characterized by positioning the crystals so that the waist of the pump beam is formed in the first crystal, and a Raleigh length of this beam is such that the beam continually expands within both crystals. This structure eliminates a need for customary focusing lens typically positioned between the crystals.

The eights aspect of the disclosure relates to the ellipticity of UV light. The system of any of the previously discussed aspects or any combination of these aspects is further configured with a corrective optical scheme minimizing the ellipticity of the output UV beam. Returning briefly to the first aspect, one can envision the situation where the maximal possible conversion efficiency of the disclosed is desired. The highest conversion efficiency in the disclosed system however comes at the expense of the ellipticity, even if the latter is good varying between 75 and 90%. If at the given maximal efficiency, the ellipticity is desired to be even better, the inventive system incorporates a corrective optical scheme located downstream from the second crystal and configured to practically eliminate the ellipticity which may be reduced to 99%.

In one preferred configuration, the corrective optics includes a reflective element with a concave surface facing the output surface of the second crystal. This concave surface reflects the output beam with the latter expanding as it propagates along the light path. The expanded output beam is incident on a collimating lens. As a result, the ellipticity of the UV beam may be enhanced to 99%. In another preferred configuration, instead of the reflective element, a negative lens may be utilized with the rest of optical scheme remaining the same as in the other configuration. Note that the corrective optical scheme may be used regardless of whether the maximal possible conversion efficiency is needed or not The disclosure is also concerned with utilizing the first and any of two through eight aspects or any combination of the latter in the disclosed laser system. The laser system, in addition to the nonlinear system of the first through eight aspects further includes a pump source which is configured as a master oscillator power fiber amplifier scheme.

In one preferable configuration, the master oscillator is a SM diode laser, whereas the Yb fiber amplifier includes a SM Yb doped fiber. In another preferable configuration, the pump source is a multimode (MM) structure.

In a further aspect, either or both the nonlinear optical system of the first through eight aspects and/or disclosed laser system is/are configured with a focusing lens which is located upstream from the first crystal in the optical system and in between the pump source and first crystal in the inventive laser system. The distance between the focusing lens and first crystal is adjusted so that the waist of the pump beam is formed in the first crystal, and a Raleigh length of this beam is such that it continually expands within both crystals. This structure eliminates a need for customary focusing lens typically positioned between the crystals.

Preferably, the focusing lens is displaceable relative to the first crystal, provided that the distance between the crystals is fixed, to determine an optimal distance at which the pump beam with a given waist and at a given crystal length of the crystals does not couple out of the second crystal. In an alternative preferable combination, the crystal may be displaceable relative to the focusing lens or both of these elements can be displaceable relative to one another.

BRIEF DESCRIPTION OF THE DRAWINGS

The above-disclosed aspects are illustrated in the following drawings, in which.

SPECIFIC DESCRIPTION

The disclosed system 25 has a simple, easily manufacturable LBO-based structure including fewer components than the known prior art. The laser system 25 is configured with two frequency conversion stages aligned with one another in a simple manner and operative to convert a fundamental wavelength $\lambda_f$ of single mode (SM) pump beam to a ⅓ $\lambda_f$ wavelength of substantially circular TH beam with the conversion efficiency of up to 70%.

Figure 1:
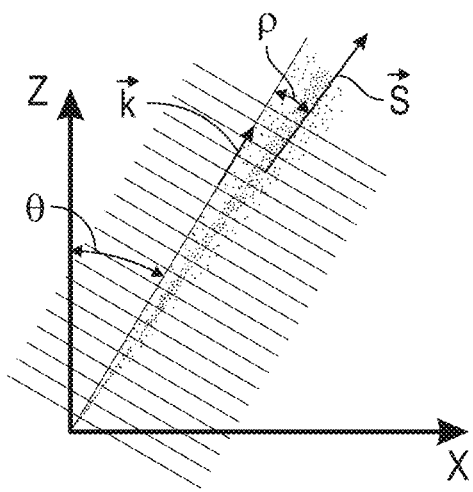
FIG. 1 is the known prior art illustrated the walk-off phenomenon.
Figure 2:
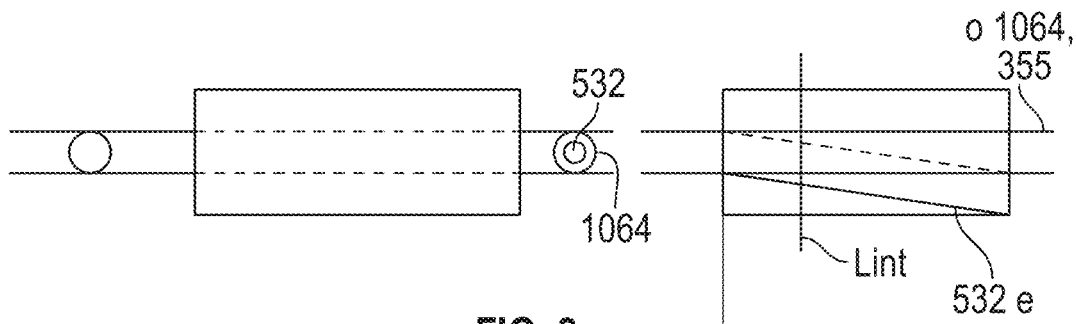
FIG. 2 is a schematic of the walk off phenomenon in a nonlinear crystal.
Figure 3:
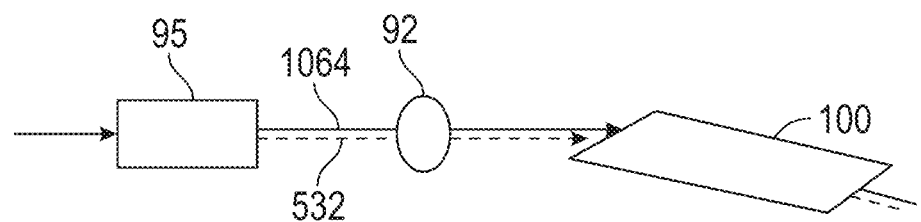
FIG. 3 is a diagrammatic view of an optical system of the known prior art configured to minimize the walk-off effect.
Figure 4:
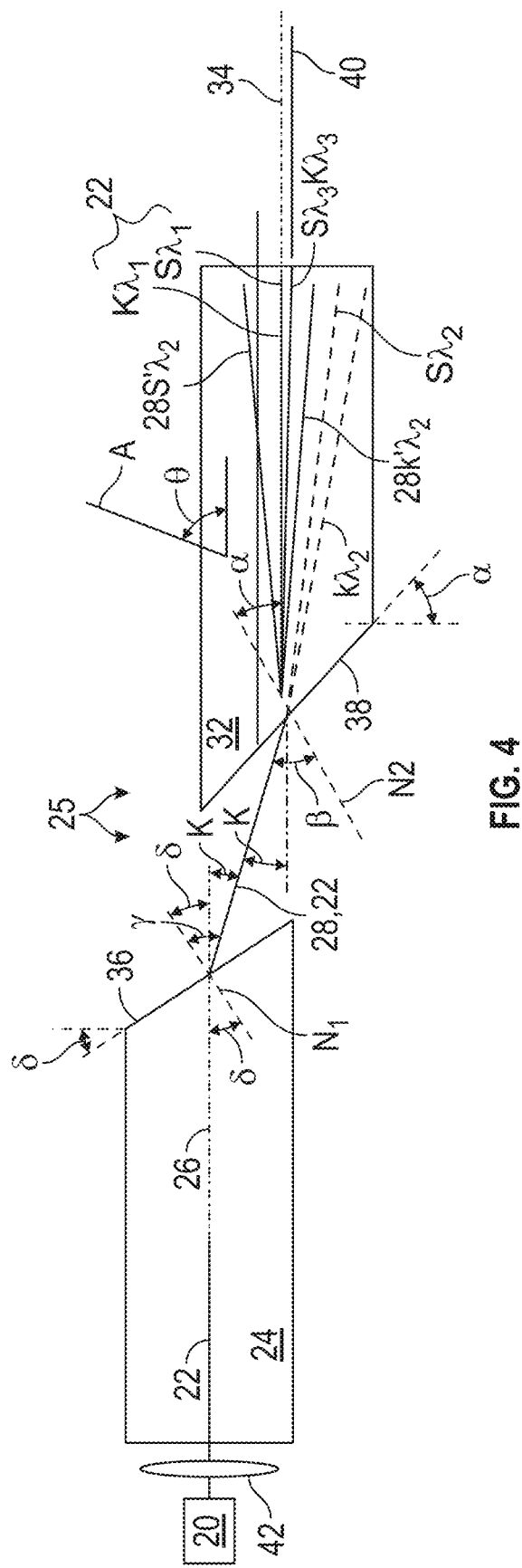
FIG. 4 is a diagrammatic view of a laser system provided with the inventive frequency conversion scheme which is designed to minimize the adverse walk-off phenomenon in a third harmonic nonlinear crystal.

Referring to FIG. 4, inventive laser system 25 is configured with pump 20, such as a SM or substantially SM fiber or any other suitable laser outputting a SM pump beam at a fundamental wavelength, such as a 1064 nm, at a 300 kHz pulsed repetition rate along a light path. The pump beam 20 is incident on a first elongated LBO crystal 24 having a longitudinal axis 26 which extends along the light path. Preferably, first crystal 24 is a type I non-critically phase-matched LBO for SHG process. As pump beam 20 propagates through first crystal 24 parallel to axis 26, its energy transfers to a generated SH beam often referred to as a signal beam 28 at a 532 nm wavelength. The SH beam 28 does not walk off pump beam 22 due to the nature of crystal 24, i.e., beams 22 and 28 are coaxial and collinear. Both beams—reminder of pump beam 22 and generated SH beam 28—exit through an output surface 30 into free space, which is void of any obstacles, remaining collinear and coaxial, but have respective polarization planes o and e orthogonal to one another.

The second LBO crystal 32 is a type II critically phase matched (PM) LBO cut at angle θ to a positive principle axis A for SFM at the interacting 1064 and 532 nm wavelengths to generate a third 355 nm wavelength of output TH beam. The crystal 32 is also elongated with a longitudinal axis 34 which is parallel to axis 26 of first crystal 24. The first and second crystals 24 and 32 are spaced apart along the light path at a distance varying between 0 and 20 mm. Also, in a plane perpendicular to both longitudinal axes, the crystals are spaced at distance between zero (0), which makes axes 26 and 34 collinear, and 1 mm.

Optimization of the frequency conversion efficiency in a SFM process of beams 22 and 28 resulting in a greater interaction length in second crystal 32 between these beams is based on the wave vector double refraction effect. The realization of the latter includes optimization of a wedge angle α, at which an input surface 38 of second crystal 32 is slanted and an incident angle β between ordinary pump and extraordinary beams 22, 28 and the normal N2 to input surface 38.

The methodology of determining the angle α is known to one skilled in the art of lasers and well explained in U.S. Pat. No. 7,292,387 fully incorporated here by reference. Typically the conversion efficiency depending on this angle selection is a result of compromise between efficiency of conversion, phase-matching conditions, such as temperature and polarization $S\lambda_2$ and wave vector $k\lambda_2$ of SH signal beam 28 and spatial overlap requirements among three interacting beams 22, 28 and SM TH output beam ordinarily polarized beam 40. In the disclosed system, desired wedge angle α and orientation of cut angle θ is selected so that pump beam 22 upon refraction is collinear with a longitudinal axis 34 of crystal 32. With the selected wedge angle α and cut angle θ, pointing vector $S\lambda_2$ and wave vector $k\lambda_2$ of SH signal beam 28, shown in dash lines and corresponding to the refraction of SH signal beam 28 in crystal 32 with a perfect rectangular cross-section, are angularly displaced to respective positions of vectors $S'\lambda_2$ and $k'\lambda_2$. As shown, vectors $S'\lambda_2$ and $k'\lambda_2$ straddle vectors $k\lambda_1$, $S\lambda_1$ of pump beam 22 because of the wedge angle α and appropriate selection of cut angle θ. As a result, the direction of wave vector $k\lambda_3$ of output TH beam 40 is determined by the vector phase-matching conditions $k_3=k_1+k_2$. The output TH beam 40 is decoupled from crystal 32 through its output surface in a plane parallel to that of input pump beam 22.

Although the walk-off angle p in system 25 characterized by parameters, which are disclosed below, is not fully compensated, the right balance is struck between the frequency conversion efficiency and ellipticity of output TH beam 40. The range of angle α is preferably within a 20°±10° range.

A further salient structural feature of this invention explaining the compactness and simplicity of disclosed system 25 includes a slanted output surface 36 of first crystal 24 at a wedge angle δ with respect to normal N1 to output surface 36. The selection of angle δ here is such that beams 22 and 28 are incident on input surface 38 of second crystal 32 at angle β with pump beam 22 propagating in crystal 32 collinearly with longitudinal axis 34. The wedge angle δ of output surface 36 of the first crystal 24 is determined in accordance with the following methodology.

First, max α angle to be determined based on max angle between wave vectors of respective pump and SH signal beams 22, 28 to preserve phase matching for a given length of the crystal. Second, orientation of the cut angle should be chosen so as to make the wave vector and pointing vector of signal beam 28 form a fan around the wave vector of pump beam 22. Knowing wedge angle α and based on Snell's law, an angle of incidence β (with respect to normal $N_2$) of both beams 22 and 28 on input surface 38 of second crystal 32 is determined as $$\beta = \arcsin(\sin(\alpha) \times n_2(1064)) \tag{1}$$

In the concrete example, with angle α equal to 17.5θ and refraction index n2=1.564 of second crystal 32 phase-matched at 100° C. for pump beam at 1064 nm, incidence angle β=28.05°. Next an angle k between incident and wedge/refraction angle α will be determined as $$k = \beta - \alpha \tag{2}$$

In the given example, k=10.55°. Now an angle γ between output beams 22 and 28 from first crystal 24 and normal N1 to output face 36 can be determined as $$\gamma = k + \delta \tag{3}$$

where δ is the wedge angle of output surface 36. Based on Snell's law $$\sin(\delta) \times n_1(1064) = \sin(\gamma) \tag{4}$$

Based on 3, 4 may be rewritten as $$\sin(\delta) \times n1(1064) = \sin(k+\delta) \tag{5}$$

For the given example, refraction index of first crystal 24 phase-matched at 150° C. for the pump beam at 1064 nm is 1.605. With the latter, $$\sin(\delta) \times 1.605° = \sin(10.55+\delta) \tag{6}$$

From 6, wedge angle δ is equal to 16.4°.

The first and second crystals may be configured in accordance with two modifications each which works perfectly well with each individual structural component of inventive system 25 as well with any suitable combination of these components. In one modification, output and input surfaces 36, 38 of respective crystals 24, 32 are slanted at different angles δ and α. In the 20°±10° range for both wedge angles, the wedge angles differ from one another, based on selected angle α and temperatures at which respective crystals are phase-matched, as little as possible. The angular difference k between the wedge angles not exceeding 2° is acceptable. Alternatively, system 25 may be designed with input and output surfaces 36, 38 being parallel to one another. Depending on spatial relationship between output and input surfaces 36, 38, respectively, first and second crystals 24 and 32 can be brought into physical contact, i.e., have a zero axial distance therebetween. Generally, the axial distance between the crystals does not exceed 20 mm.

The disclosed structure 25 can be also configured with both crystals 24 and 32 located in a common plane which is perpendicular to longitudinal axes 26 and 34. In this configuration, the axes are collinear. Alternatively, first and second crystals 24, 32, respectively, extend in parallel planes spaced apart in a direction perpendicular to the axes at no more than 1 mm.

Each of dimensional alternatives disclosed above can be used in combination with all other individual features of disclosed structure 25 or any possible combination of these components.

In contrast to systems disclosed in the known prior art, ordinary pump beam 22 and extraordinary SH signal beam 28 propagate between crystals 24 and 32 through obstacle-free free space, if the crystals are axially spaced apart. There is no need for a focusing lens typically located between the crystals.

However, inventive system 25 includes a focusing lens 42 located between pump source 20 and first crystal 24. The lens 42 is configured so that SM pump beam 22 has a waste formed in the first crystal. With the selected crystal's length, wedge angles and spacing between crystals, pump beam 22 extends through second crystal 32 without expanding beyond the physical boundaries of this crystal, except of course for the second crystal's output surface. If necessary, lens 42 may be automatically or manually displaced in a plane parallel to axis 26 to provide the optimal frequency conversion efficiency into TH output beam.

Figure 8:
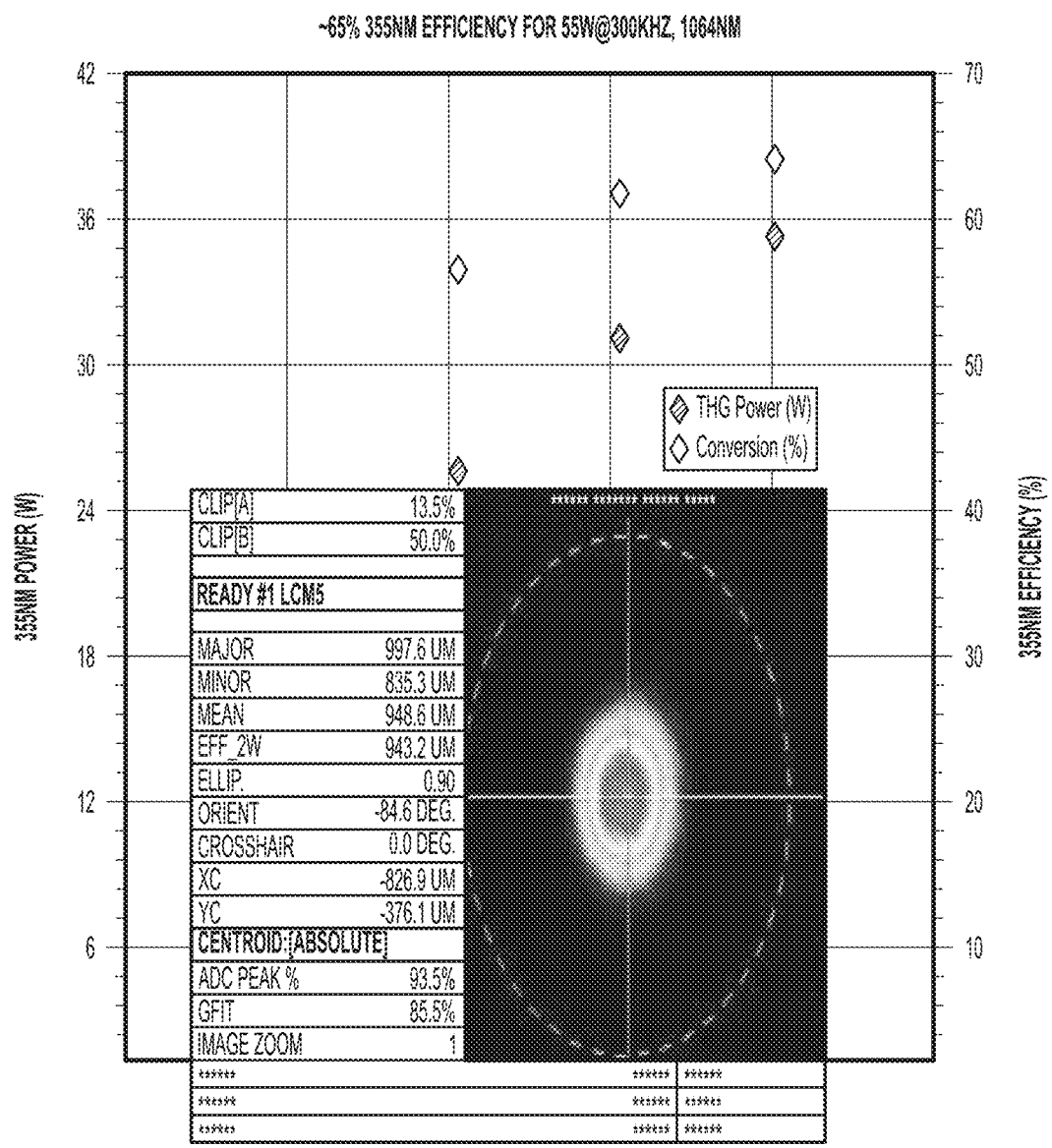
FIGS. 8 and 9 are computer generated graphs indicating experimental data obtained with the use of the inventive system of FIG. 4.
Figure 9:
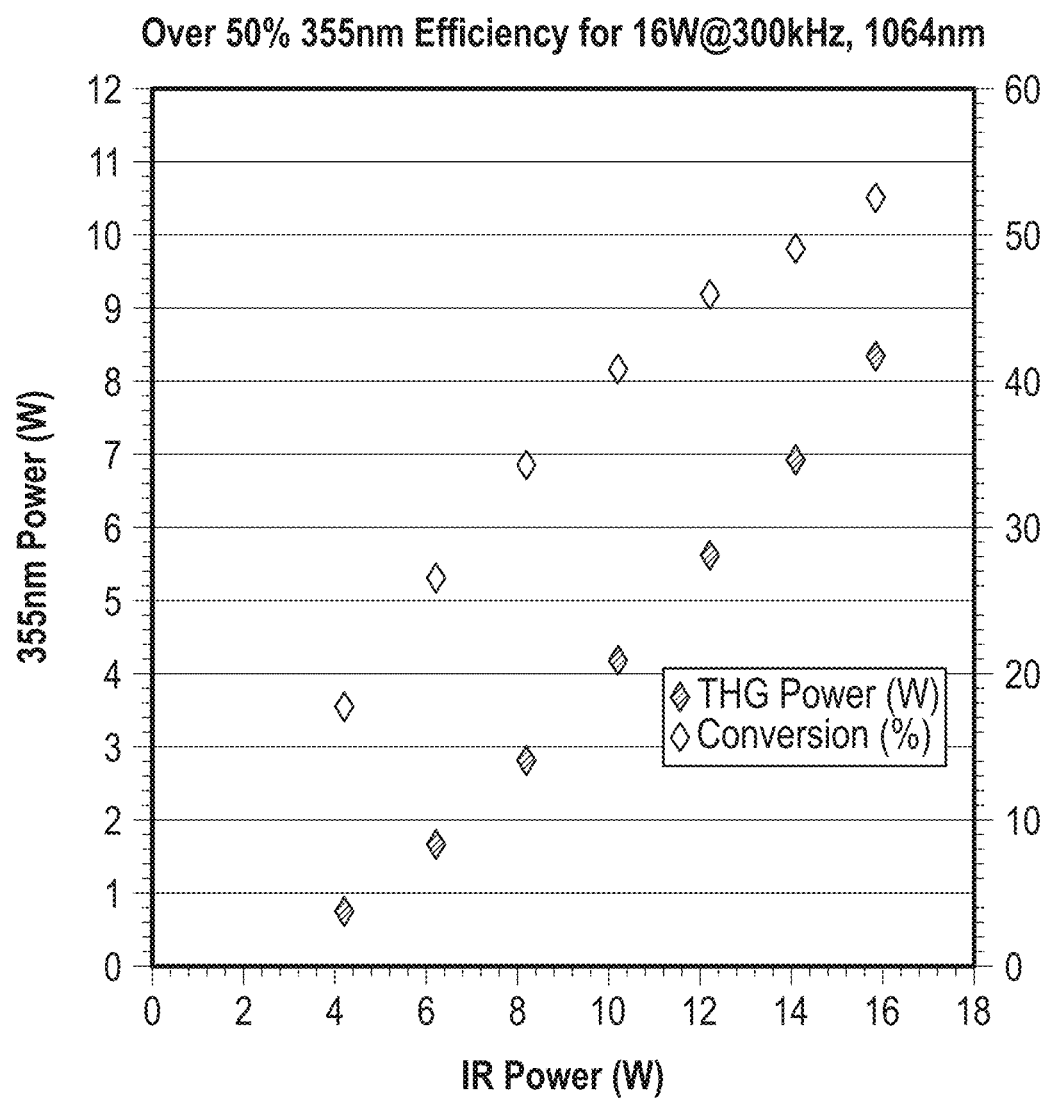

Referring to FIGS. 8 and 9, for the length of each crystal 24, 32 varying in a 2-2.5 cm range, wedge angle α of 17.5° and δ angle of 16.4 and IR pump source 20, which outputs single mode (SM) IR beams at a 1064 nm wavelength and average power above 15 W, the inventive system operates at a frequency conversion efficiency into TH output beam 40 at a 355 nm wavelength and pulse duration of 1.5 ns of up 70% (FIG. 8) The frequency conversion efficiency in the inventive system with pump source 20 outing an IR beam at a 1064 fundamental wavelength and average power below 15 W reaches 50%, as shown in FIG. 9. The conversion efficiency could be even higher, but other considerations such astigmatism and ellipticity of TH output beam 40 weight heavily in, as disclosed below.

In particular, with still very high disclosed frequency conversion efficiencies for Gaussian or substantially Gaussian beams with $M^2$ of up to 1.2, the disclosed wedge angles α and δ, the astigmatism of TH beam is inconsequential and ellipticity may be about 0.8. However, both astigmatism and ellipticity ranges, even without further optical correction, are still very high for focused SM beams having Gaussian intensity profiles. However, these ranges can be improved with the following beam shape optical corrective scheme.

Figure 5:
FIG. 5 is a diagrammatic view of the inventive beam-shape corrective optical system configured to improve astigmatism and ellipticity of the output beam of system of FIG. 4.

Referring to FIG. 5, disclosed corrective optical scheme 50 includes a reflective element 46 along the light path downstream from second crystal 32. The element 46 is configured with a concave surface reflecting TH output beam 40. Depending on a concrete set-up, reflected expanding TH beam 40 may be incident on a mirror 42. The beam 40 continues to expand along the light path until it impinges upon a collimating lens 48.

Figure 6:
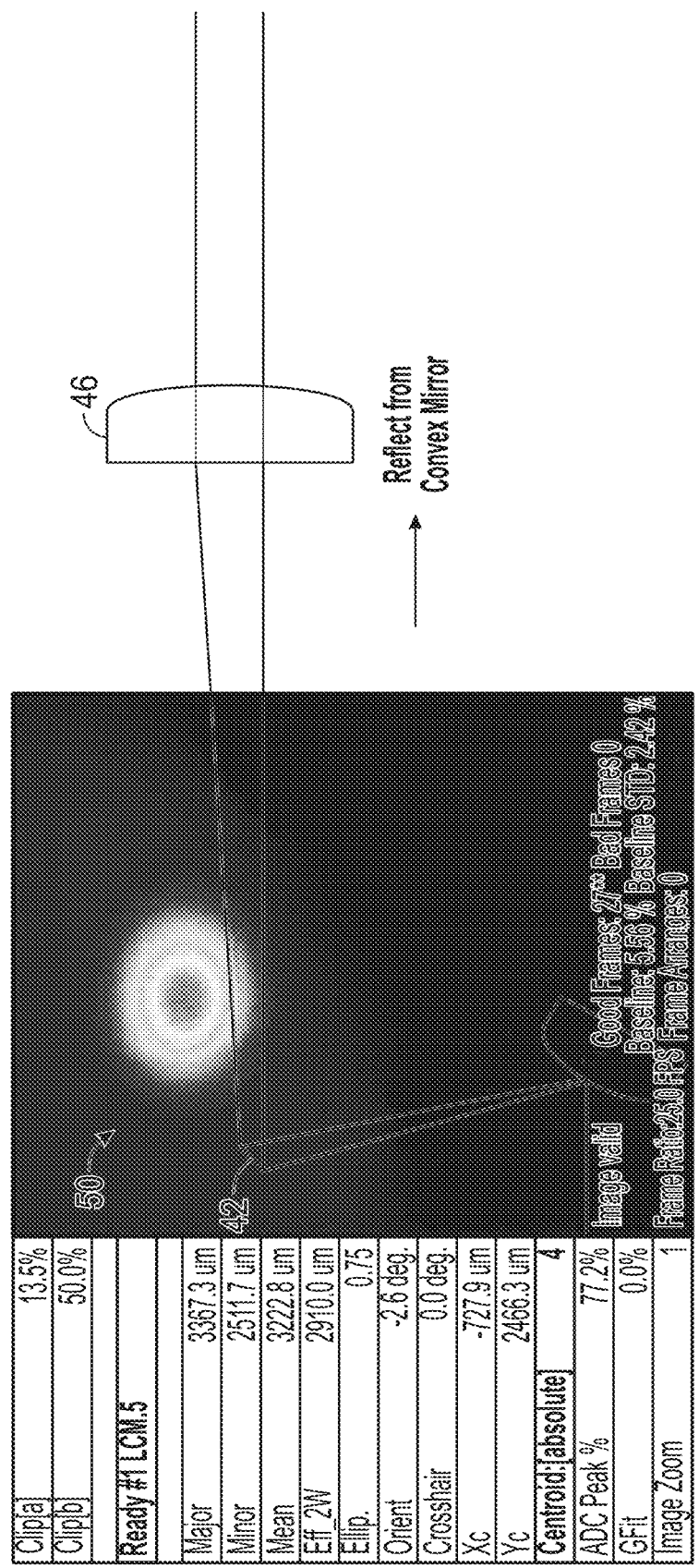
FIGS. 6 and 7 are computer generated images of the output beam emitted by the inventive system of FIG. 4 assembled without and with the corrective system of FIG. 5, respectively.
Figure 7:
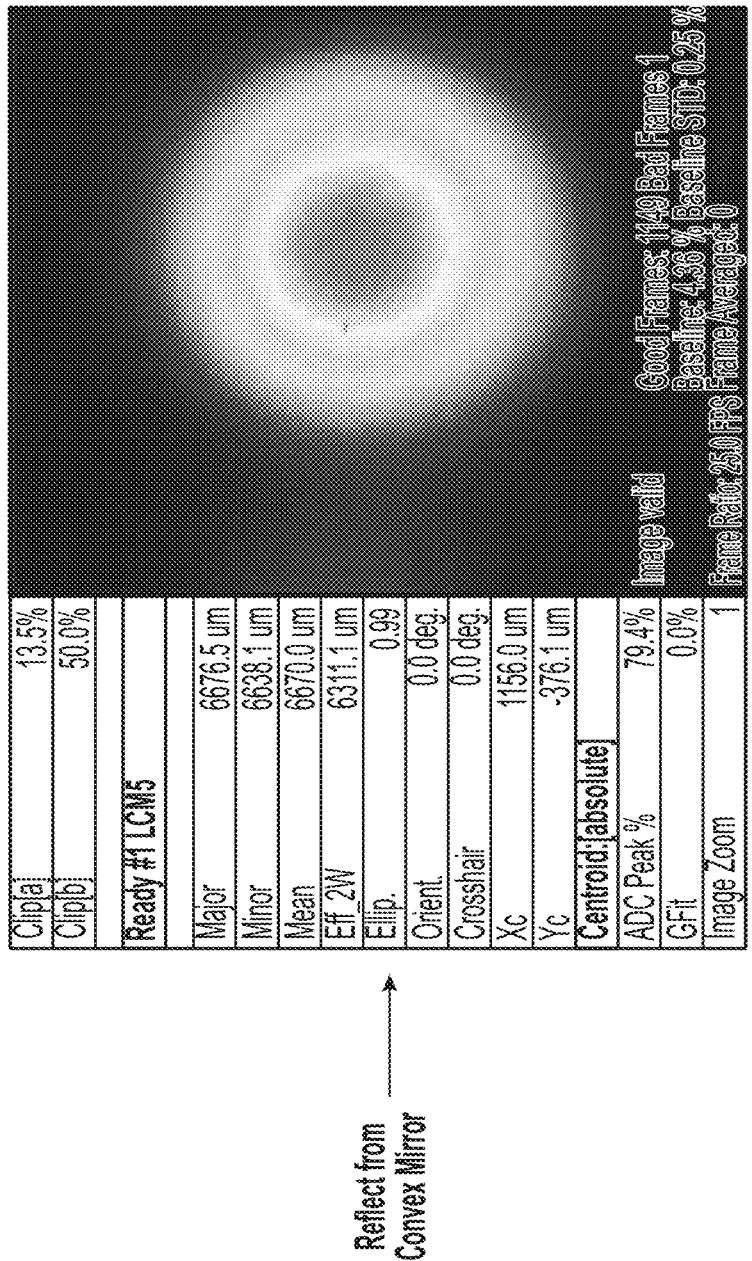

The effect of corrective scheme 50 is illustrated in FIGS. 6 and 7. FIG. 6 shows the ellipticity of about 0.78 of TH output beam of inventive system 25 without corrective system 50. FIG. 7 shows the improvement of both the beam's ellipticity reaching 0.99% and astigmatism that can be of 0.95 D.

While the subject invention has been described with reference to a preferred embodiment, various changes and modifications could be made therein by one skilled in the art, without varying from the scope and spirit of the subject invention as defined by the appended claims.

The invention claimed is:

1. A nonlinear optical system, comprising:
    an elongated second harmonic generation (SHG) crystal having a longitudinal axis and traversed by a pulsed pump beam at a fundamental frequency which generates a second harmonic (SH) beam, SHG crystal having an output surface inclined relative to the longitudinal axis of the SHG crystal at a first angle α different from a right angle;
    an elongated third harmonic generation (THG) crystal having a longitudinal axis, which is parallel to the longitudinal axis of the SHG crystal, and an input surface, a remainder of the pump beam and the SH beam being collinear and coaxial with one another upon impinging the input surfaces of the THG crystal and propagating through the THG crystal at a walk-off angle therebetween to generate a third harmonic (TH) beam, the input surface of the THG crystal being inclined to the longitudinal axis of the THG crystal at a second angle δ different from the right angle.

2. The nonlinear optical system of claim 1, wherein the SHG crystal is a type I non-critically phase-matched LBO, whereas the THG crystal is configured as a type II critically phase-matched LBO.

3. The nonlinear optical system of claim 1, wherein the output and input surfaces of respective SHG and THG crystals extend in respective planes which are either parallel to or non-parallel to one another.

4. The nonlinear optical system of claim 1, wherein the SHG and THG crystals are either coplanar or offset in a direction perpendicular to the longitudinal dimension of the crystals at a distance which does not exceed 1 mm.

5. The nonlinear optical system of claim 1, wherein the SHG and THG crystals are spaced from and in optical communication with one another over free space, the free space being void of optical components interposed between the SHG and THG crystals.

6. The nonlinear optical system of claim 1, wherein the output and input surfaces of respective SHG and THG crystals are next to one another or spaced apart along a light path at a distance of up to 20 mm.

7. The nonlinear optical system of claim 1 further comprising a focusing lens upstream from the SHG crystal, the focusing lens and the SHG crystal being controllably displaced relative to one another to provide the pump beam with a waist formed within the SIG crystal, wherein the pump beam expands along the light path so that as the pump beam propagates through the THG crystal it is confined within the THG crystal.

8. The nonlinear optical system of claim 1 further comprising a corrective optical scheme downstream from the THG crystal, the corrective optical scheme including a reflective element with a concave surface reflecting the THG beam and a collimator receiving the reflected THG beam to provide the latter with astigmatism of about 0.95 D and ellipticity of about 0.99, wherein a maximum conversion efficiency of a fundamental frequency of the pump beam, which is a single transverse mode (SM) beam, to the third harmonic in the THG crystal reaches 60% for the SM pump beam of up to 30 W and 70% for the SM pump beam above 30 W.

9. A frequency conversion laser system comprising:
a single mode (SM) pulsed laser light source configured to output a puked pump light beam at a fundamental frequency; and
the nonlinear optical system of claim 1.

10. The frequency conversion laser system of claim 9, wherein the SM pulsed light source has a SM diode laser and a fiber amplifier assembled as a master oscillator power fiber amplifier scheme and operating at a 300 kHz pulsed repetition rate.

11. The nonlinear optical system of claim 1, wherein the first angle $\alpha$ is within a range of 20°±10°, and
wherein the second angle $\delta$ is derived from equations (1) to (4)

$$\beta = \arcsin(\sin(\alpha) \times n) \quad (1)$$

$$k = \beta - \alpha \quad (2)$$

$$\gamma = k + \delta \quad (3)$$

$$\sin(\delta) \times \eta = \sin(k + \delta) \quad (4),$$

wherein n is the refraction index of the THG crystal.

* * * * *